US008903926B2

(12) United States Patent
Bastide et al.

(10) Patent No.: US 8,903,926 B2
(45) Date of Patent: Dec. 2, 2014

(54) ONLINE SOCIAL NETWORK HANDLE TYPE AHEAD ENHANCEMENT

(75) Inventors: Paul R. Bastide, Boxford, MA (US); Matthew E. Broomhall, South Burlington, VT (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 13/471,029

(22) Filed: May 14, 2012

(65) Prior Publication Data
US 2013/0304827 A1 Nov. 14, 2013

(51) Int. Cl.
G06F 15/16 (2006.01)

(52) U.S. Cl.
USPC .......................................... 709/206

(58) Field of Classification Search
USPC ................................. 709/206, 224
See application file for complete search history.

(56) References Cited

U.S. PATENT DOCUMENTS

| | | | |
|---|---|---|---|
| 7,069,308 B2 | 6/2006 | Abrams | |
| 7,117,254 B2 | 10/2006 | Lunt et al. | |
| 2005/0278430 A1* | 12/2005 | Cato | 709/206 |
| 2009/0150514 A1 | 6/2009 | Davis et al. | |
| 2009/0213435 A1* | 8/2009 | Cohen | 358/402 |
| 2009/0319288 A1 | 12/2009 | Slaney et al. | |
| 2010/0088246 A1 | 4/2010 | LIm | |
| 2010/0091959 A1* | 4/2010 | Miki et al. | 379/88.17 |
| 2010/0269049 A1* | 10/2010 | Fearon | 715/744 |
| 2010/0281122 A1* | 11/2010 | Li et al. | 709/206 |
| 2010/0332330 A1 | 12/2010 | Goel et al. | |
| 2011/0184886 A1 | 7/2011 | Shoham | |
| 2012/0259928 A1* | 10/2012 | Deshpande et al. | 709/206 |

OTHER PUBLICATIONS

Parris et al., Privacy-enhanced social network routing in opportunistic networks, 8th IEEE International Conference on Pervasive Computing and Communications Workshops (PERCOM Workshops), 2010, Publisher: IEEE, Piscataway, NJ; Country of Publication: USA; ISBN: 978-1-4244-6605-4; Database: INSPEC.

* cited by examiner

*Primary Examiner* — Joshua Joo
(74) *Attorney, Agent, or Firm* — Scully, Scott, Murphy & Presser, P.C.; Dermott Cooke, Esq.

(57) ABSTRACT

Determining a correct user with whom to communicate, e.g., the correct intended recipient of an electronic message in electronic communications. In one aspect, an unintended recipient may identify the message as unintended. In another aspect, a time lapse in response or lack of response from the recipient may flag an unintended recipient. Using a likeness algorithm, users related to the recipient is identified and the message may be sent to those identified related users.

20 Claims, 3 Drawing Sheets

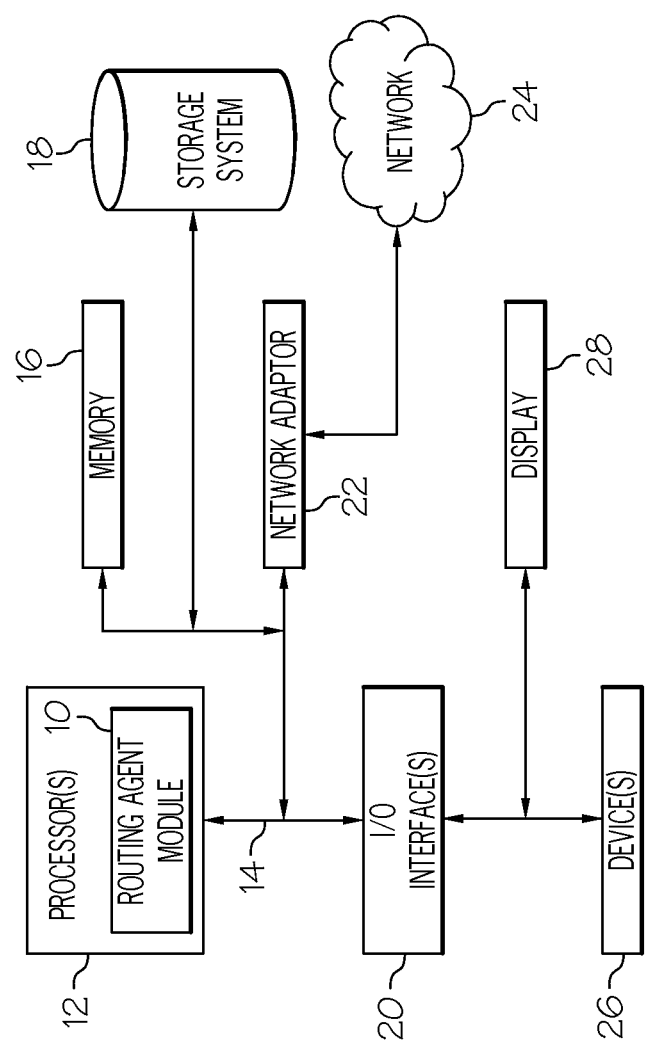

ONLINE SOCIAL NETWORK HANDLE TYPE AHEAD ENHANCEMENT

FIELD

The present application relates generally to computers, and computer applications, social computing, collaboration and communications, and more particularly to determining the correct intended recipient of an electronic communication.

BACKGROUND

Online social networking systems generally have a common directory or set of users, which enables users to connect and communicate with others. This feature is often manifested in the form of username, handle or unique identifier. While using such forms of addressing provides the ability to quickly communicate with an end user, it also leads to misdirected tweets, updates or posts, if such forms are not accurately identified in the message. This may happen due to typographical errors, confusion with similar names and/or due to other reasons. For instance, there may exist online social networking handles such as paul1, paul2, paul22 for users whose names are Paul and the sender may not use the correct handle for the intended Paul; there may also exist identifiers such as telephone numbers that differ only by one number, e.g., 123-111-2222 versus 133-111-2222, in which case a mistype or misidentification of even one number or character can cause directing the communication to an incorrect unintended recipient. Thus, in those cases where there are many similar communication identifiers or handles, the messages more often than not are inadvertently sent to the wrong user.

BRIEF SUMMARY

A method and system for determining an intended recipient of an electronic message are provided. The method, in one aspect, may include detecting a flag associated with the electronic message sent to a recipient that indicates that the recipient is not the intended recipient. The method may also include identifying a first user related to the recipient based on a likeness algorithm. The method may further include sending the electronic message to the first user. The method may also include, if the first user does not respond within a predetermined time or responds by setting the flag that the first user is not the intended recipient: identifying a second user related to the first user based on the likeness algorithm, sending the electronic message to the second user, if the second user responds to the electronic message indicating that the second user is the intended recipient: determining the second user as the intended recipient, and updating automatically the electronic message to include an identifier of the second user. The method may yet further include, if the first user responds to the electronic message indicating that the first user is the intended recipient: determining the first user as the intended recipient, and updating automatically the electronic message to include an identifier of the first user.

A system for determining an intended recipient of an electronic message, in one aspect, may include a routing agent module operable to execute on the processor and further detect a flag associated with the electronic message sent to a recipient that indicates the recipient is not the intended recipient. The routing agent module may be further operable to identify a first user related to the recipient based on a likeness algorithm, send the electronic message to the first user, and if the first user does not respond within a predetermined time or responds by setting the flag that the first user is not the intended recipient, the routing agent module may be further operable to identify a second user related to the first user based on the likeness algorithm, send the electronic message to the second user, and if the second user responds to the electronic message indicating that the second user is the intended recipient, the routing agent module may be further operable to determine the second user as the intended recipient, and update automatically the electronic message to include an identifier of the second user. If the first user responds to the electronic message indicating that the first user is the intended recipient, the routing agent module may be further operable to determine the first user as the intended recipient, and update automatically the electronic message to include an identifier of the first user.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 3 illustrates a schematic of an example computer or processing system that may implement the system in one embodiment of the present disclosure.

DETAILED DESCRIPTION

A method and system of the present disclosure in one embodiment seek to determine the correct user with whom to communicate, e.g., the correct intended recipient of an electronic message in the electronic communications. For example, a sender of an electronic message may desire to communicate with a recipient by sending the electronic message to the recipient's address identified by for example, an online social networking handle, an email address, instant messaging, or another such identifier. In doing so, the sender inadvertently may use an incorrect recipient's identifier. This, for example, may occur when the intended recipient has a similar identifier to others in the sender's relationships and/or contact list. A method and system may be presented in the present disclosure to identify the correct intended recipient. The method and system may include, in one aspect, the unintended recipient identifying a message as unintended. In another aspect, the method and system may include utilizing a time lapse in response or lack of response from the recipient.

In response to detecting that a message was delivered to the incorrect user, the system and method of the present disclosure in one embodiment may broadcast the message first to the related users in the sender's network, and upon further flag or lack of response from those related users, the system and method of the present disclosure in one embodiment may further broadcast the message to users who are related to those related users (e.g., related friends of friends).

In addition, in an online social networking scenario, upon detecting that none of those users are the intended recipient (e.g., from lack of response or by a flag that sets that none of those users are the intended recipient), the system and method of the present disclosure in one embodiment may broadcast the message to the related users in the entire online social network. Subsequent communication with the properly identified user may be placed into the online social network type ahead as a preferred contact for a pre-defined period of time. The method and system of the present disclosure in one aspect may utilize and apply broadcast parameters such as time delay, confidentiality and detection to properly treat a message being possibly sent to incorrect recipients. In that way, the system and method of the present disclosure in one embodiment allows for routing of messages and communications between the proper intended users.

In the present disclosure, the term "identifier" is used generally to refer to username, handle, or other identifier provided for addressing a user in electronic communications. The term "message" is used in the present disclosure to generally refer to the content being communicated to the recipient and may include but not limited to, social networking site posts, updates, chat, instant messages, and/or email messages.

Figure 1:
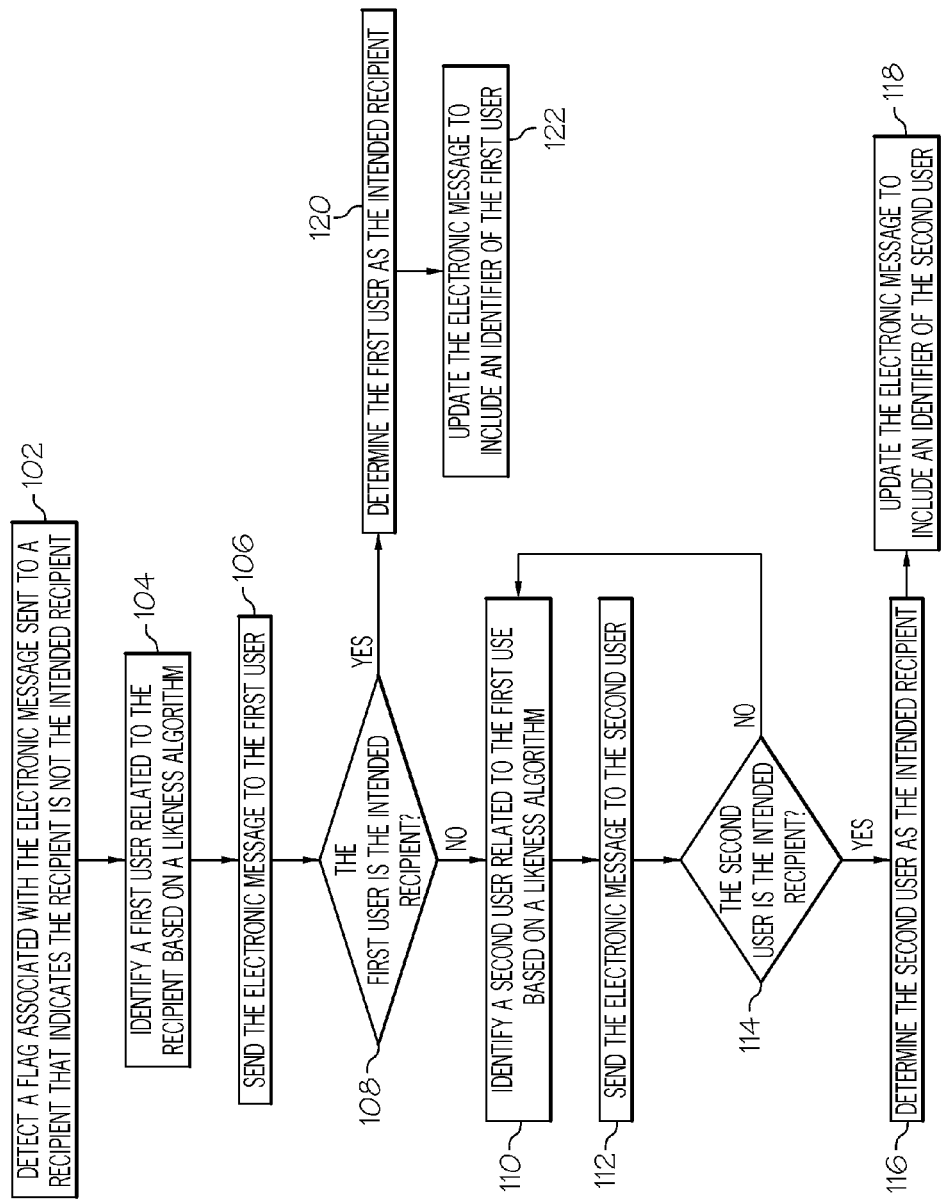
FIG. 1 is a flow diagram illustrating a method of the present disclosure of determining an intended recipient of an electronic message in one embodiment.

FIG. 1 is a flow diagram illustrating a method of the present disclosure of determining an intended recipient of an electronic message in one embodiment. At 102, the method may comprise detecting a flag associated with the electronic message sent to a recipient that indicates that the recipient is not the intended recipient. For example, consider a scenario in which a sender would like to send a message to a recipient named Paul. There may exist more than one user with name Paul, and each may have an identifier that is similar to another user having the same name, e.g., Paul1, Paul11. The sender may intend to send the message to the user with Paul11 identifier, but inadvertently send the message to the user with Paul1 identifier. In this case, the recipient of the message (Paul1) is not the intended recipient (Paul11). The unintended recipient of the message (Paul1) may indicate that he is not the correct recipient of the message, for instance, by setting a flag such as a "not-for-me" flag, associated with the message. In one aspect, a recipient of a message may be given an option to click or select on a user interface of the communication application (e.g., email application, social networking application), indicating such "not-for-me" status. Internally, such indication may trigger a bit being set, for example, in a message header. In another aspect, such flag may be set automatically if that unintended recipient do not reply to the sent message within a time period. Such expiration time period may be parameterized or configured.

In detecting that the message was sent to an unintended recipient, the method may further comprise at 104, identifying a first user related to the recipient based on a likeness algorithm and at 106 sending the electronic message to the first user. An example of a likeness algorithm may include, but not limited to, Approximate String Matching technique. For instance, one or a plurality of related users may be identified based on an algorithm that finds one or more users with identifiers that have likeness to the identifier of the intended recipient. The message may be then sent to the identified related users. In cases where more than one related user is identified, in one aspect, the message may be sent one at a time to each of the identified related users, for example, until an intended user is identified. In another aspect, the message may be sent in a broadcast manner to all of the identified related users all at once.

At 108, if the first user or a plurality of first users do not respond within a predetermined time or responds by setting the flag that the first user is not the intended recipient, at 110, the method may further comprise identifying a second user related to the first user based on the likeness algorithm, and at 112 sending the electronic message to the second user. This for example is analogous to finding a friend of a friend, and so forth.

If at 114, the second user responds to the electronic message indicating that the second user is the intended recipient, the method may further comprise at 116, determining the second user as the intended recipient, and at 118 updating automatically the electronic message to include an identifier of the second user.

If the second user or a plurality of second users also is not the intended recipient the method may repeat by identifying a third user that is related to the second user, for instance, analogous to finding a friend of a friend of a friend. The method may repeat until the intended recipient is found or until a termination criterion is met, for instance, a number of repetitions have been exhausted. Thus, for example, at 114, if the second user is not the intended user, the logic may continue at 110 with the first user being set as the second user, and where a new second user is identified.

At 108, if the first user responds to the electronic message indicating that the first user is the intended recipient, the method may further comprise at 120, determining the first user as the intended recipient, and at 122 updating automatically the electronic message to include an identifier of the first user.

Figure 2:
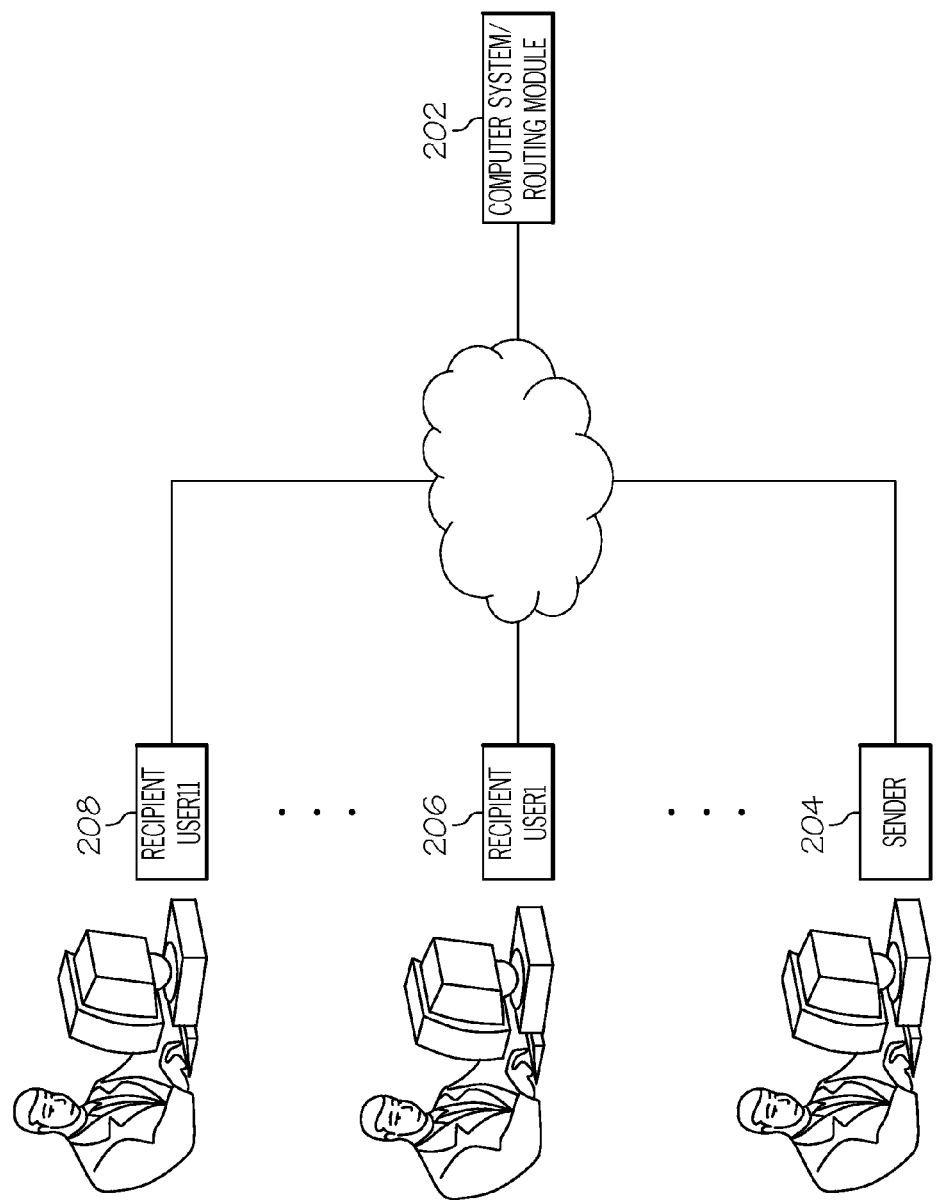
FIG. 2 is a block diagram illustrating components of a system in one embodiment of the present disclosure in an example scenario.

FIG. 2 is a block diagram illustrating components of a system in the following scenario. There exists a plurality of recipients, e.g., with identifiers user1 (206) and user11 (208). A sender 204 is intending to send a message to the user at user1 (206), but instead types user11 when sending the message. The message is sent via a routing agent or module 202. User11 (208) receives the message from the sender 204, but does not know the sender or does not know the reference to the message. User11 (208) may flag the message as not-for-me, and the message may be sent back to the routing module 202 and the routing module 202 is notified of the need for a change in the recipient's identifier. In another aspect, the routing module 202 may automatically set the flag based on a lack of response, for instance, within a predetermined time period. If this is the first change notification, e.g., referred to as first change, the routing module 202 may identify one or more related users that have like identifiers to the sender, e.g., friends of the sender (e.g., user1, user1, user2, user3, etc., being similar). For example, the routing module 202 may identify user1 as one that is similar to user11. The routing module 202 may automatically change the recipient identifier to user1 and send the message to that user (206). The sender 204 may see user11 changed to user1. user1 (206) acknowledges and responds to the message and the sender 204 continues to communicate with user1 (206). Thus, the system and method of the present disclosure may further be extended to work with subsequent messages as threaded with user1 (206).

As another example, if user1 also was not the intended user, for instance, the sender 204 meant to send the message to another user (e.g., user2), user1 may also flag the not-for-me flag. In that case, another change notification may be generated, e.g., referred to as second change. In response, the routing module 202 may identify another set of related users, for example, identifiers of users that are related user1 (206), using a likeness algorithm. The routing module 202 may broadcast to all like identifiers or a single like identifier at a time.

In implementing the rerouting of the messages to like users, policy considerations may be taken into account. For example, a sender of the message may indicate the message as not appropriate for rerouting, e.g., those that include confidential material should not be rerouted. Users may also be enabled to opt-in for risk based analysis of a message before migrating the message to users beyond an organization, an online social network relationship or a defined organization hierarchy. A policy and administration feature may be implemented to control the access to the routing methodology of the present disclosure and its features. In another aspect, users may choose to be alerted to the need to change the user identifier before the message is rerouted.

The above methodology may be application for communicating messages, for instance, in an online social network. In such online social network systems, a directory of networked users may each have a unique user name/identifier. A routing agent may direct a message from a sender to a recipient. A first flag may indicate that the receiving user is an unintended recipient or is non-responsive to the sent message or communication. A change communication is generated in response to the first flag, and the routing agent is notified to redirect the message or communication to an intended recipient based on relationship of the sender with the intended recipient. A subsequent flag and subsequent change communication may occur until the message or communication is successfully received by the intended recipient. The subsequent change communication may be based on layers of likeness level/relationship between sender and intended recipient. The system and method of the present disclosure in one aspect, thus, may leverage the message sender's relationship (e.g., relationship tree) to determine the correct intended recipient of a communication when the intended recipient has a similar identifier to others in the sender's relationships.

FIG. 3 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12.

The processor 12 may include a routing module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for determining an intended recipient of an electronic message, comprising:
   detecting, by a processor, a flag associated with the electronic message sent to a recipient that indicates that the recipient is not the intended recipient;
   identifying a first user related to the recipient based on a likeness algorithm;
   sending the electronic message to the first user;
   if the first user does not respond within a predetermined time or responds by setting the flag that the first user is not the intended recipient:
      identifying a second user related to the first user based on the likeness algorithm,
      sending the electronic message to the second user,
      if the second user responds to the electronic message indicating that the second user is the intended recipient:
         determining the second user as the intended recipient, and
         updating automatically the electronic message to include an identifier of the second user;
   if the first user responds to the electronic message indicating that the first user is the intended recipient:
      determining the first user as the intended recipient, and
      updating automatically the electronic message to include an identifier of the first user.

2. The method of claim 1, wherein the flag is set by the recipient.

3. The method of claim 1, wherein the flag is set automatically by the processor based on an expiration of time for receiving a response from the recipient.

4. The method of claim 1, wherein the updating automatically the electronic message to include an identifier of the first user includes notifying the sender of the identifier of the first user as the intended recipient.

5. The method of claim 1, wherein the updating automatically the electronic message to include an identifier of the second user includes notifying the sender of the identifier of the second user as the intended recipient.

6. The method of claim 1, further including updating a history of sent messages to include the intended recipient as a correct recipient of the electronic message.

7. The method of claim 1, wherein the identifying a first user includes identifying a plurality of first users, and the sending the electronic message to the first user includes sending the electronic message to the plurality of first users.

8. The method of claim 7, wherein the electronic message is sent to the plurality of first users one at a time or the electronic message is sent to the plurality of first users all at once.

9. The method of claim 1, wherein the identifying a second user includes identifying a plurality of second users, and the sending the electronic message to the second user includes sending the electronic message to the plurality of second users.

10. The method of claim 9, wherein the electronic message is sent to the plurality of second users one at a time or the electronic message is sent to the plurality of second users all at once.

11. The method of claim 1, further including:
   requesting a permission from the sender to send the electronic message to the first user before the step of sending the electronic message to the first user; or
   requesting a permission from the sender to send the electronic message to the second user before the step of sending the electronic message to the second user; or
   combination thereof.

12. The method of claim 1, further including determining whether the electronic message includes confidential information and if the electronic message includes confidential information, the electronic message is not sent to the first user and the second user.

13. A non-transitory computer readable storage medium storing a program of instructions executable by a machine to perform a method of determining an intended recipient of an electronic message, comprising:
   detecting, by a processor, a flag associated with the electronic message sent to a recipient that indicates the recipient is not the intended recipient;
   identifying a first user related to the recipient based on a likeness algorithm;
   sending the electronic message to the first user;
   if the first user does not respond within a predetermined time or responds by setting the flag that the first user is not the intended recipient:
      identifying a second user related to the first user based on the likeness algorithm,
      sending the electronic message to the second user,
      if the second user responds to the electronic message indicating that the second user is the intended recipient:

determining the second user as the intended recipient, and updating automatically the electronic message to include an identifier of the second user;

if the first user responds to the electronic message indicating that the first user is the intended recipient: determining the first user as the intended recipient, and updating automatically the electronic message to include an identifier of the first user.

14. The non-transitory computer readable storage medium of claim 13, wherein the flag is set by the recipient.

15. The non-transitory computer readable storage medium of claim 13, wherein the flag is set automatically by the processor based on an expiration of time for receiving a response from the recipient.

16. The non-transitory computer readable storage medium of claim 13, further including updating a history of sent messages to include the intended recipient as a correct recipient of the electronic message.

17. The non-transitory computer readable storage medium of claim 13, further including alerting the sender of a need to change the recipient of the electronic message before rerouting the electronic message to the first user.

18. A system for determining an intended recipient of an electronic message, comprising:

a processor;

a routing agent module operable to execute on the processor and further detect a flag associated with the electronic message sent to a recipient that indicates the recipient is not the intended recipient;

the routing agent module further operable to identify a first user related to the recipient based on a likeness algorithm, send the electronic message to the first user, and if the first user does not respond within a predetermined time or responds by setting the flag that the first user is not the intended recipient, the routing agent module further operable to identify a second user related to the first user based on the likeness algorithm, send the electronic message to the second user, and if the second user responds to the electronic message indicating that the second user is the intended recipient, the routing agent module further operable to determine the second user as the intended recipient, and update automatically the electronic message to include an identifier of the second user, and if the first user responds to the electronic message indicating that the first user is the intended recipient, the routing agent module further operable to determine the first user as the intended recipient, and update automatically the electronic message to include an identifier of the first user.

19. The system of claim 18, wherein the flag is set by the recipient.

20. The system of claim 18, wherein the flag is set automatically by the processor based on an expiration of time for receiving a response from the recipient.

\* \* \* \* \*